No. 661,493. Patented Nov. 13, 1900.
H. M. CASE.
COMBINED COVER AND STRAINER FOR MILK OR CREAMING CANS.
(Application filed Aug. 2, 1900.)
(No Model.)
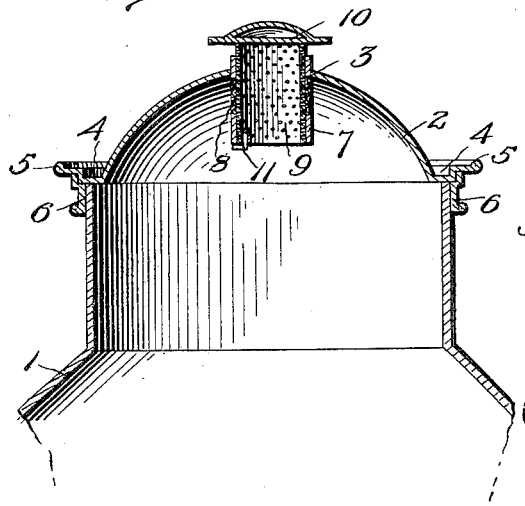
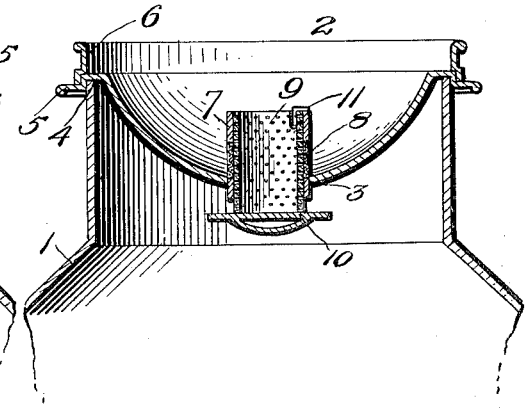
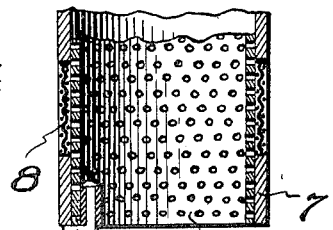
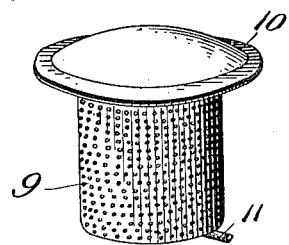
Inventor
Henry M. Case
by H. R. Willison & Co.
Attorneys
Witnesses

UNITED STATES PATENT OFFICE.

HENRY M. CASE, OF PHELPS, NEW YORK.

COMBINED COVER AND STRAINER FOR MILK OR CREAMING CANS.

SPECIFICATION forming part of Letters Patent No. 661,493, dated November 13, 1900.

Application filed August 2, 1900. Serial No. 25,680. (No model.)

*To all whom it may concern:*

Be it known that I, HENRY M. CASE, a citizen of the United States, residing at Phelps, in the county of Ontario and State of New York, have invented certain new and useful Improvements in a Combined Cover and Strainer for Milk or Creaming Cans; and I do declare the following to be a full, clear, and exact description of the invention, such as will enable others skilled in the art to which it appertains to make and use the same.

My invention relates to a combined cover and strainer for milk and creaming cans, and has for its object to provide a simple, cheap, and effective device of this character which may be readily and conveniently cleaned, affords free ventilation, and is designed to strain the milk in an effective manner.

With this and other minor objects in view the invention consists of certain novel features of construction, combination, and arrangement of parts, as will be hereinafter more fully described, and particularly pointed out in the appended claim.

In the accompanying drawings, Figure 1 is a central vertical section of a combined cover and strainer embodying my invention, showing the application of the same as a cover to a milk or creaming can. Fig. 2 is a similar view showing the device inverted to serve as a strainer. Fig. 3 is a perspective view of the removable strainer-tube and spreader cap or disk. Fig. 4 is a detail view of the catch.

Referring now more particularly to the drawings, in which like reference characters designate corresponding parts throughout the several views, 1 represents a milk or creaming pail or can of the ordinary or any approved construction, and 2 the combined cover and strainer.

The cover and strainer consists of a bell-shaped body provided with a central opening 3, a depressed outer edge 4, an elevated rim 5, and a flange 6, which latter is adapted to fit around the mouth of the can when the device is used as a cover. In the central opening 3 is secured the upper end of a fixed strainer-tube 7, formed at diametrically opposite sides above its center with openings covered by wire-gauze 8, forming strainer-openings, through which the milk passes in entering the can and through which ventilation is also afforded. A removable strainer-tube 9, formed of wire-gauze or foraminous sheet metal, is adapted to fit within the said fixed strainer-tube 7 and is open at one end and closed at the other end by a spreader cap or disk 10, having a plane bottom and a convex top, as shown. At its inner or lower open end the said tube 9 carries a pivoted catch or detent 11, which is adapted to engage the inner or lower end of the fixed strainer or tube 7 to hold the removable tube 9 and spreader against displacement.

Fig. 1 of the drawings shows the device applied for use as a ventilating-cover, and in this application of the device the flange 6 fits around the mouth of the can 1 and supports the device and the tube 9 projects upward sufficiently to permit of free ventilation and the outward passage of the animal heat and odors. The bell formation of the body and plane surface of the spreader-disk are of advantage in this connection, as they serve to deflect the currents of air to the perforated removable tube, and thus establish a free downward circulation of fresh air from the exterior to the interior of the can to carry off the animal heat and odors. A current of air in circulating about the room or compartment in which the can is located is deflected on encountering the bell-body of the cover and is forced to pass upward until arrested by the disk 10, which deflects the air downward and thereby establishes a circulation of air into and through the can, the air on being heated by the heat driven off from the milk rising and passing outward and carrying off with it the animal heat and odors.

When the device is to be used as a strainer, it is inverted, as shown in Fig. 2, and the depressed portion 4 receives the upper edge of the can, while the rim 5 holds the device in position. The milk is poured into the bell-shaped body and flows through the gauze 8 and tube 9 to the interior thereof and then out through the lower end of said tube 9, down upon the disk 10, which serves to spread and deflect the milk and divide it into a plurality of streams, which is of advantage when the device is used in connection with a gravity separator or creaming-can in which a cooling liquid is employed to facilitate separation. The foreign matter carried by the milk is retained by the strainer-tube, which may be conveniently cleaned upon removing tube 9. The tube 9 may be raised or lowered in the tube 7, as the case may be, to expose a greater or less surface for ventilation or straining.

From the foregoing description, taken in connection with the accompanying drawings, the construction and mode of operation of the device will be readily understood, and it will be seen that a simple and effective device for the purpose designated is provided.

Changes in the form, proportion, and minor details of construction may be made within the scope of the invention without departing from the spirit or sacrificing any of the advantages thereof.

Having thus fully described my invention, what is claimed, and desired to be secured by Letters Patent, is—

A combined concave and reversible cover and strainer for milk and creaming cans, comprising a body having a central opening, a fixed strainer-tube arranged in said opening, a removable strainer and ventilating tube adapted to fit within the fixed tube and provided at one end with a spreader-head, and a pivoted L-shaped catch upon the opposite end of the removable strainer and adapted to engage the inner end of said fixed tube to hold the removable tube in position, substantially as set forth.

In testimony whereof I have hereunto set my hand in presence of two subscribing witnesses.

HENRY M. CASE.

Witnesses:
W. D. NORTON,
WALTER S. ROOT.